United States Patent [19]
Killmann et al.

[11] 3,741,680

[45] June 26, 1973

[54] SPLIT HOUSING PILOTING DEVICE

[75] Inventors: Irolt G. Killmann, St. Augustin, Germany; Lawrence R. Matto, Shelton, Conn.

[73] Assignee: Avco Corporation, Stratford, Conn.

[22] Filed: Apr. 5, 1972

[21] Appl. No.: 241,281

[52] U.S. Cl. ............... 415/219 R, 285/DIG. 14
[51] Int. Cl. ............................................. F01d 25/24
[58] Field of Search ................. 415/199 R, 219 R; 285/DIG. 14; 138/99; 220/5 A

[56] References Cited
UNITED STATES PATENTS

| | | | |
|---|---|---|---|
| 3,628,884 | 12/1971 | Mierley, Sr. ................... | 415/219 R |
| 2,417,195 | 3/1947 | Hargreaves ................. | 285/DIG. 14 |

FOREIGN PATENTS OR APPLICATIONS

| | | | |
|---|---|---|---|
| 571,011 | 2/1933 | Germany......................... | 415/219 R |
| 112,516 | 2/1941 | Australia......................... | 415/219 R |
| 510,672 | 8/1939 | Great Britain ................. | 415/219 R |
| 55,978 | 1/1922 | Sweden........................... | 415/199 R |
| 903,160 | 8/1962 | Great Britain ................. | 415/219 R |

*Primary Examiner*—Henry F. Raduazo
*Attorney*—Charles M. Hogan and Gary M. Gron

[57] ABSTRACT

A pair of annular split housings are secured in end-to-end relationship so that their parting lines lie in a common plane. A series of tabs on one housing extends across the end-to-end junction into recesses in the adjacent housing to maintain the center lines of both housings within the common plane. Thus, the split line of the housings functions as the pilot surface for the housings.

14 Claims, 4 Drawing Figures

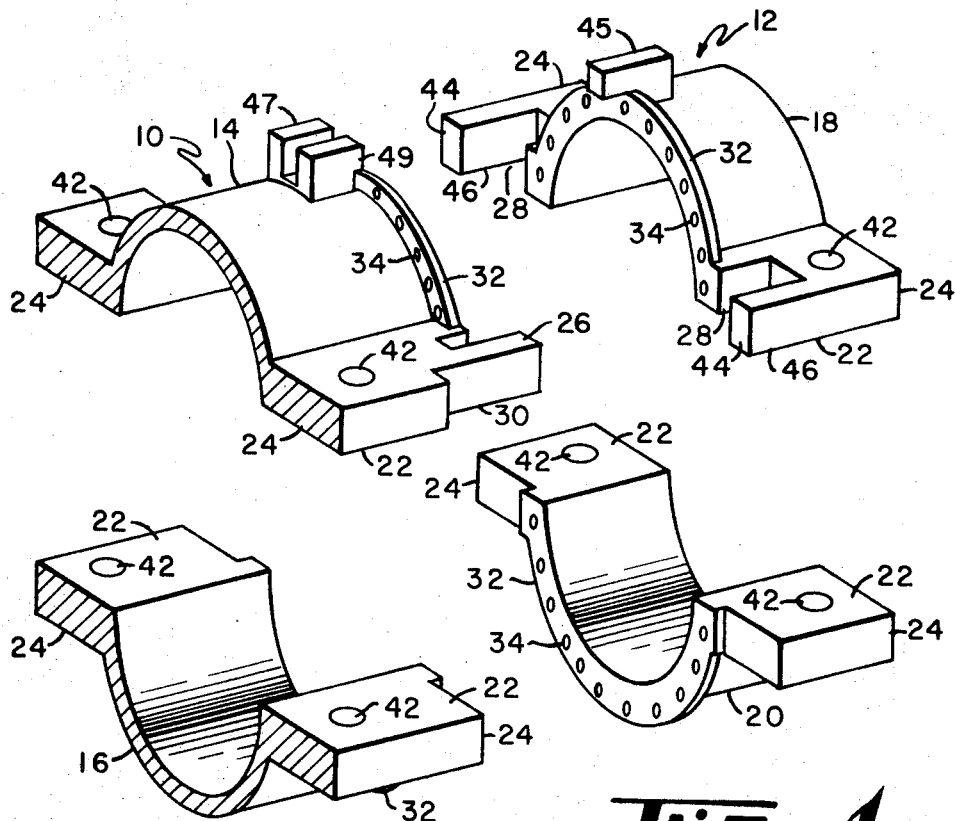

SPLIT HOUSING PILOTING DEVICE

The present invention relates to a device for holding a pair of annular housings concentric with respect to one another.

There are many instances in which it is desrable to secure two annular housings in end-to-end relationship and maintain their axes concentric. One of the more important instances in which this is necessary is in the gas turbine art. Gas turbine engines generally comprise a series of annular housings secured to one another in end-to-end relationship. The housings have radial struts that journal a rotor assembly within the several housings. It is apparent that if the housings are out of alignment with one another the rotor and housings can rub and cause appreciable wear.

In the past, housings have been piloted with respect to one another by means of concentric pilot rings machined on or attached to each housing. These pilot rings are sometimes undesirable, especially when the two mating housings are of different materials and/or operate at different temperature levels. The difference in thermal growth may then cause the ring pilot to loosen during operation or to tighten beyond the elastic stress limits of at least one of the materials, thus resulting in loosening of the pilot when the parts again reach room temperature.

This problem is sometimes overcome by providing on one housing a series of spaced radial grooves and on the adjacent housing a series of aligned radial tabs. With this arrangement the tabs seat in the grooves and maintain the axes of the housings in alignment. This approach, while generally effective, presents a number of problems when the housings are split to enable access to the interior rotors or vanes. Because of the interconnection between the radial tabs and the grooves, the housings must be pulled apart, along with disassembly of the rotor in many cases, to facilitate separation into the halves.

Therefore it is an object of the present invention to pilot several split housing assemblies in a way permitting them to be readily disassembled.

These ends are achieved by using the split line of a pair of split, end-to-end housings as the piloting surface. This is accomplished by sets of projections on two of the halves extending across the end-to-end junction to maintain the axes of the housings within the common plane so that the parting line of the housings serves as the pilot surface. A means is provided for aligning the axes of said housings within said common plane.

The above and other related objects and features of the present invention will be apparent from a reading of the description of the disclosure shown in the accompanying drawing and the novelty thereof pointed out in the appended claims.

In the drawings:

FIG. 1 is an exploded perspective view of a pair of split housing assemblies embodying the piloting device of the present invention;

FIG 2 is an assembled plan view of a different scale of the split housing assembly of FIG. 1;

Figure 4:
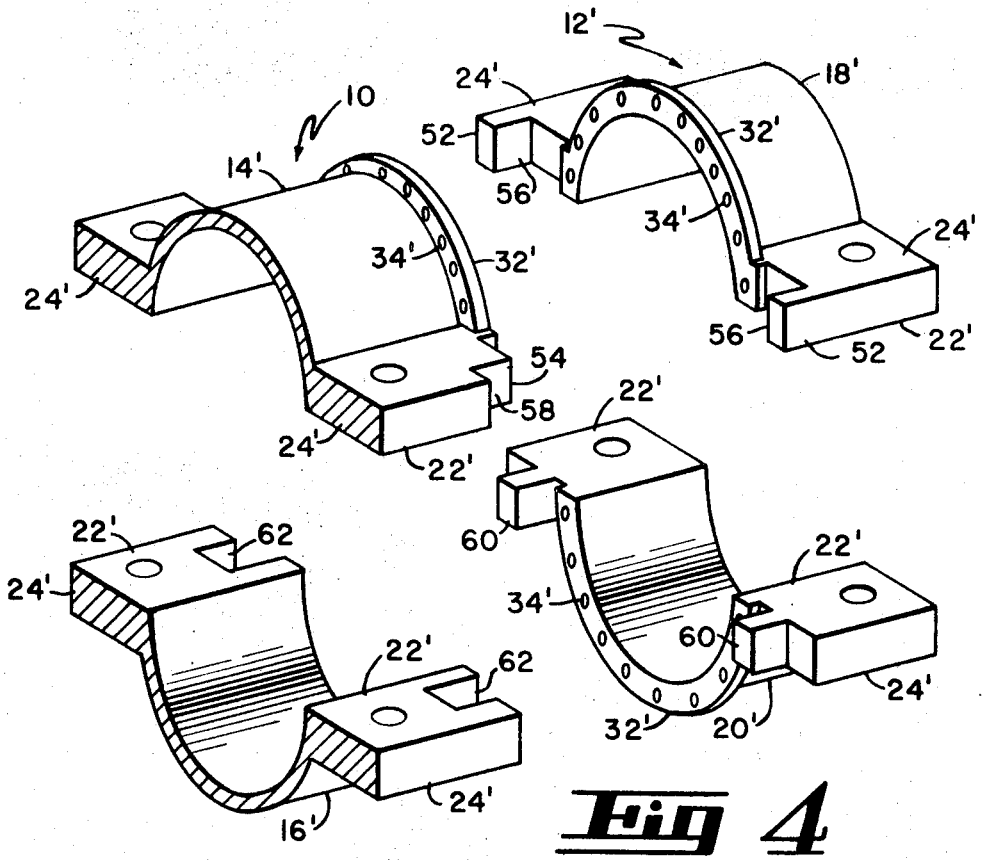
FIG. 4 is an exploded perspective view of a housing assembly showing still another embodiment of the present invention.

Referring to FIG. 1 there is shown first and second generally annular housings 10 and 12, each comprised of halves 14, 16 and 18, 20, respectively. The housings 10 and 12 are adapted to be placed in end-to-end relationship so that housing 14 is adjacent housing half 18 and half 16 is adjacent housing half 20. In addition, the split line of the housings lies along a common plane.

Each of the housing halves have pilot surfaces 22 parallel to the common plane and adjacent the end-to-end junction between the housings. When the housings are assembled the pilot surfaces 22 of the respective halves abut at the common plane. As shown herein, the pilot surfaces 22 are illustrated as formed on enlarged radial extensions 24 to facilitate the discussion of the invention.

The housing halves each have radial flanges 32 at the end-to-end junction. These flanges have a series of aligned holes 34 which receive a bolt and nut assembly 38 to hold the housings in end-to-end relation. The housing halves are secured together through a suitable arrangement, such as bolt assemblies 40 extending through openings or holes 42 in the radial extensions 24.

Housing 14 has a pair of projections 26 on opposite sides of its axis (integral with radial extensions 24). These projections extend across the end-to-end junction between the housings and are received within recesses 28 of the adjacent housing half 18. Projections 26 have pilot surfaces 30 that are parallel to the common plane and positioned to abut pilot surfaces 22 of housing 20 (diagonally positioned with respect to housing 14) when the housings are secured together. Housing 18 has a pair of projections 44 on opposite sides of its axis that extend across the end-to-end junction between the housings. As seen particularly in FIG. 2, projections 44 are offset with respect to projections 26. When the housings are assembled, pilot surfaces 46 on projections 44 abut the pilot surfaces 22 of housing 16 which is diagonally positioned with respect to housing 18.

In the assembled form, projections 26 prevent movement of the axis of the housing 12 upward relative to the axis of housing 10. Projections 44 prevent movement of the axis of the housing 10 upward relative to the axis of housing 12. Thus the axes of both housings are retained within the common plane.

For reasons other than piloting (sealing, positioning, etc.), surface 22 must be machined accurately. In almost all practical cases, surfaces 30 and 46 are identical with surface 22, thus no additional machining of the pilot surfaces is necessary.

Sufficient clearance around all other surfaces of the projections 26 and 44 allow for dimensional tolerances and for different thermal growth of the parts. These other surfaces therefore can, for example, remain as cast or as forged.

The axes are aligned within the common plane by pilot surfaces perpendicular to the common plane provided on tab 45 and bracketing tabs 47, 49 on the adjacent half. These tabs are positioned normal to the common plane for the halves and in line with the axes of the housings. As shown in FIGS. 1 and 2, the cooperating tabs are shown only on halves 18 and 14 to simplify the discussion of the invention. In practice, however, the tabs would be employed both on the upper and lower halves.

Tab 45 is integral with half 18 and extends across the end-to-end junction between the halves and is received between bracketing tabs 47, 49 integral with half 14. Thus the cooperating tabs each prevent relative lateral movement of one another. This in turn prevents relative lateral movement in the common plane of the housing axes.

During a change in temperature the entire circumferences of the housings grow at a different rate but their axes remain aligned. The holes 34 in the flanges 32 and the holes 42 in radial extensions 24 have sufficient clearance relative to the bolt assemblies to permit relative radial movement of the flanges and radial extensions to minimize stresses during this relative circumferential expansion.

Another possibility for keeping the axes aligned within the common plane while still allowing for different thermal growth, would be to use one radial groove each on housings 14 and 16, positioned perpendicular to the common plane (surface 22), and radial or axial tabs or pins in the housings 18 and 20 fitting into the radial groove. Should both housings exhibit equal thermal growth or should the thermal growth be negligible, a pair of surfaces on the tabs 26 and 44 can be used for aligning within the common plane, as shown in FIG. 3.

The tabs 26 have a radially outwardly facing pilot surface 48 which abuts a radially inwardly facing pilot surface 50 in recess 28. When the tabs abut the pilot surfaces they align the axis of the housings 10 and 12 within the common plane.

Figure 3:
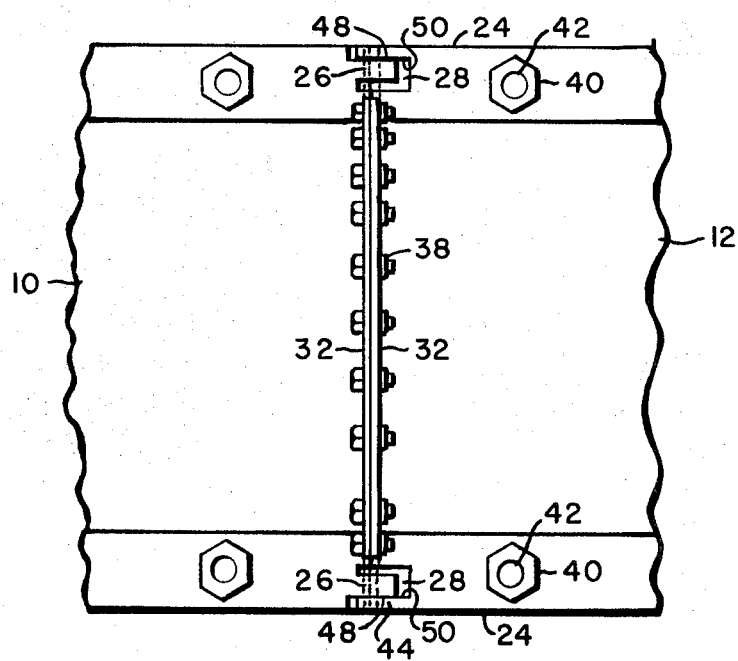
FIG. 3 is an assembled plan view of a housing assembly showing another embodiment of the present invention.

The embodiment of FIGS. 1, 2 and 3 incorporates projections on adjacent halves to maintain the housing axes in the common plane. The piloting device of FIG. 4 utilizes projections on the upper and lower halves to accomplish the piloting function. In this figure there is shown housings 10' and 12', each made up of halves 14', 16' and 18', 20', respectively. The housings have flanges 32' and openings 34' for the bolt assemblies. They also have pilot surfaces 22' parallel to the common plane in which the housings are joined, these pilot surfaces being formed on radial extensions 24'.

In this embodiment housing 18' has a pair of tabs 52 which extend across the end-to-end junction between the housings to be received in recesses 54 on the adjacent housing half 14'. Tabs 52 have radially inwardly facing pilot surfaces 56 which abut radially outwardly facing pilot surfaces 58 in recesses 54 to align the axes of the housings within the common plane.

Housing half 20' has a pair of tabs 60 extending across the end-to-end junction between the housings and into recesses 62 with sufficient side clearances in adjacent housing half 16'.

The tabs 52 and 60 each have pilot surfaces parallel to the common plane which abut the pilot surfaces 22' to maintain the axes of the housings within the common plane. It should be apparent to those skilled in the art that if the housings of FIG. 4 have different thermal expansion, the cooperating tabs shown in FIGS. 1 and 2, or other suitable methods, may be employed to maintain the alignment of the housing axes.

Both piloting devices described above permit the radially outward removal of one of the housings for inspection of its inside. There are no grooves or projections which impair the radial removal of the housings. Thus this assembly has great utility in the gas turbine art, for example, compressor housings, where one of the housings would be between a series of end-to-end housings. With this arrangement, the housing half can be removed to facilitate inspection of the interior without major disassembly of the engine.

The positioning of the housing within the common plane (split line) can be done by various means, for example, by pins or tabs fitting into grooves or brackets of the opposite housing. The location of these surfaces can be chosen freely and adapted to the special requirements of the design. It is possible to place them 90° apart from the split line, as shown in FIG. 1, or, as another extreme, they can be placed on the tabs on the split line, as shown in FIG. 3. Every other position in between these extremes is also feasible. There can also be more than one pin or tab on each half, but this would increase the tolerance problems. In order to insure separate assembly and disassembly of each half, the surfaces used for alignment within the plane must be perpendicular to the common plane. When different thermal growth is involved, the surfaces should be positioned close to the axial plane which is normal to the split plane.

In manufacturing housings embodying this invention no additional machining is necessary for piloting, as the split line has to be machined anyway for sealing purposes. All surfaces other than the pilot surface of the tabs may remain as cast or as forged or very roughly machined, thus minimizing manufacturing costs.

The relationships between the tabs and recesses have been set forth as preferred embodiments of the present invention. It should be apparent, however, that the relative positioning of the tabs and recesses may be varied without departing from the spirit and scope of the present invention.

Having thus described the invention, what is claimed as novel and desired to be secured by Letters Patent of the United States is:

1. A piloting device for a pair of coaxial annular housings split in halves, secured together along a common plane and secured in end-to-end relationship, said piloting device comprising:

sets of projections on two of said halves extending across said end-to-end junction and having pilot surfaces parallel to said common plane for preventing movement normal to said common plane of the half diagonally positioned with respect to the half from which said set of projections extends, thereby maintaining the axes of said housings within said common plane; and means for aligning the axes of said housings within said common plane, whereby the split lines of the housings serve as a pilot surface.

2. A piloting device as in claim 1 wherein:

one set of said projections extends from one of said halves;

the other set of said projections extends from the half in end-to-end relationship with said first-mentioned half, said sets of projections being offset from one another.

3. A piloting device as in claim 2 wherein said means for aligning the axes of said housings within the common plane comprises:

a set of radially facing pilot surfaces on one set of said projections;

a set of radially facing pilot surfaces on the half in end-to-end relationship with the half from which said projections extend, the pilot surfaces on said half abutting the pilot surfaces on said projections, said radially facing pilot surfaces being perpendicular to the common plane.

4. A piloting device as in claim 1 wherein:
one set of said projections extends from one of said halves;
the other set of said projections extends from the half positioned opposite with respect to said first-mentioned half, said sets of projections being offset from one another.

5. A piloting device as in claim 4 wherein said means for aligning the axes of said housings comprise:
a set of radially facing pilot surfaces on one set of said projections;
a set of radially facing pilot surfaces on the half in end-to-end relationship with the half from which said projections extend, the pilot surfaces on said half abutting the pilot surfaces on said projections, said radially facing pilot surfaces being perpendicular to the common plane.

6. A piloting device as in claim 1 for housings operating at different temperature levels and/or having different coefficients of thermal expansion wherein said means for aligning the axes of said housings comprise interconnecting means on adjacent halves positioned at a point normal to said common plane in line with the axes of said housings for preventing relative movement of the axes of said halves in a direction parallel to said common plane.

7. A piloting device as in claim 6 wherein said interconnecting means comprises:
a tab on one of said halves extending across the end-to-end junction between said housings; and
a pair of tabs extending from the half in end-to-end relationship with the half from which said tab extends, said pair of tabs bracketing said tab for preventing relative movement in a direction parallel to said plane,
the surfaces abutting each other being normal to the common plane.

8. A housing assembly comprising:
a pair of coaxial annular housings split in first and second halves along a common plane;
means for securing said halves together and said housings together so that the first halves of said housings are in end-to-end alignment and the second halves are in end-to-end alignment;
each of said housings having pilot surfaces on the first and second halves parallel to and lying in said common plane adacent the end-to-end junction between said housings and positioned so that the pilot surfaces on the first half abut the pilot surfaces on the second half generally at said common plane;
sets of projections on two of said halves extending across said end-to-end junction and having pilot surfaces abutting the pilot surfaces of the half positioned diagonally with respect to the half from which said projections extend, thereby maintaining the axes of said housings within said common plane; and
means for aligning the axes of said housings within said common plane.

9. A housing assembly as in claim 8 wherein:
one set of said projections extends from one of said halves;
the other set of said projections extends from the half in end-to-end relationship with said first-mentioned half, said sets of projections being offset from one another.

10. A housing assembly as in claim 9 wherein said means for aligning the axes of said housings comprises:
a set of radially facing pilot surfaces on one set of said projections;
a set of radially facing pilot surfaces on the half in end-to-end relationship with the half from which said projections extend, the pilot surfaces on said half abutting the pilot surfaces on said projections.

11. A housing assembly as in claim 8 wherein:
one set of said projections extends from one of said halves;
the other set of said projections extends from the half positioned opposite with respect to said first-mentioned half, said sets of projections being offset from one another.

12. A housing assembly as in claim 11 wherein said means for aligning the axes of said housings comprise:
a set of radially facing pilot surfaces on one set of said projections;
a set of radially facing pilot surfaces on the half in end-to-end relationship with the half from which said projections extend, the pilot surfaces on said half abutting the pilot surfaces on said projections and being normal to the common plane.

13. A housing assembly as in claim 8 wherein said housings operate at different temperature levels and/or have different coefficients of thermal expansion and wherein said means for aligning the axes of said housings comprise interconnecting means on adjacent halves positioned at a point normal to said common plane in line with the axes of said housings for preventing relative movement of the axes of said halves in a direction parallel to said common plane.

14. A housing assembly as in claim 6 wherein said interconnecting means comprises:
a tab on one of said halves extending across the end-to-end junction between said housings;
a pair of tabs extending from the half in end-to-end relationship with the half from which said tab extends, said pair of tabs bracketing said tab for preventing relative movement in a direction parallel to said plane,
the surfaces abutting each other being normal to the common plane.

* * * * *

PO-1050
(5/69)

UNITED STATES PATENT OFFICE
CERTIFICATE OF CORRECTION

Patent No. 3,741,680        Dated June 26, 1973

Inventor(s) IROLT G. KILLMANN and LAWRENCE R. MATTO

It is certified that error appears in the above-identified patent and that said Letters Patent are hereby corrected as shown below:

Claim 13 should be cancelled.

Col. 1, line 5, "desrable" should read "desirable".

On the cover sheet, after the abstract, "14 Claims" should read -- 13 Claims --.

Signed and sealed this 26th day of March 1974.

(SEAL)
Attest:

EDWARD M. FLETCHER, JR.
Attesting Officer

C. MARSHALL DANN
Commissioner of Patents